United States Patent [19]

Tsujioka et al.

[11] Patent Number: 5,272,689
[45] Date of Patent: Dec. 21, 1993

[54] OPTICAL HEAD SYSTEM WITH TRANSPARENT CONTACT MEMBER

[75] Inventors: Tsuyoshi Tsujioka; Shigeaki Yamamoto, both of Osaka; Fumio Tatezono, Hirakata; Minoru Kume, Nara; Kotaro Matsuura, Kyoto, all of Japan

[73] Assignee: Sanyo Electric Co., Ltd., Osaka, Japan

[21] Appl. No.: 419,021

[22] Filed: Oct. 10, 1989

[30] Foreign Application Priority Data

Oct. 12, 1988 [JP] Japan .................. 63-256757
Oct. 12, 1988 [JP] Japan .................. 63-256759
May 17, 1989 [JP] Japan .................. 1-123914
Jul. 11, 1989 [JP] Japan .................. 1-179412

[51] Int. Cl.⁵ .............................. G11B 7/12
[52] U.S. Cl. .................. 369/112; 369/44.18; 369/97
[58] Field of Search ........... 369/44.17, 44.18, 97, 369/111, 113, 164, 275.1, 112, 97, 100, 115, 116, 119, 57, 58; 350/164, 166; 360/114

[56] References Cited

U.S. PATENT DOCUMENTS

| | | | |
|---|---|---|---|
| 3,980,811 | 9/1976 | Schaefer et al. | 178/6.6 |
| 4,023,033 | 5/1977 | Bricot . | |
| 4,293,944 | 10/1981 | Izumita . | |
| 4,551,827 | 11/1985 | Custer et al. | 369/97 |
| 4,812,016 | 3/1989 | Miyata et al. | 350/164 |
| 4,886,959 | 12/1989 | Hoshi et al. | 369/112 |
| 4,907,846 | 3/1990 | Tustison et al. | 350/164 |
| 4,970,707 | 11/1990 | Hara et al. | 369/44.17 |
| 4,998,239 | 3/1991 | Strandjord et al. | 369/275.1 |

FOREIGN PATENT DOCUMENTS

| | | |
|---|---|---|
| 0156453 | 2/1985 | European Pat. Off. . |
| 0263656 | 4/1988 | European Pat. Off. . |
| 53-37722 | 10/1978 | Japan . |
| 53-39123 | 10/1978 | Japan . |
| 57-12188 | 3/1982 | Japan . |
| 57-205834 | 3/1983 | Japan . |
| 60-30017 | 7/1985 | Japan . |
| 61-273745 | 12/1986 | Japan . |
| 62-8339 | 1/1987 | Japan . |
| 61-240445 | 3/1987 | Japan . |
| 62-109233 | 5/1987 | Japan . |
| 63-122021 | 10/1988 | Japan . |

OTHER PUBLICATIONS

"Organic Non-Linear Materials For Optics" p. 24 Table 1.2.1 CMC Co. Jul. 25, 1985.

Primary Examiner—Dale M. Shaw
Assistant Examiner—Thai Tran
Attorney, Agent, or Firm—Stanger, Stempler & Dreyfus

[57] ABSTRACT

An optical head device for projecting a light beam on a recording medium to record data thereon or reproduce the recorded data comprises an optical system for forming a beam spot of a specified diameter on the surface of the recording medium, and a transparent contact member disposed at a light emanating portion of the system for the recording medium to come into direct sliding contact therewith. Accordingly, when the contact member moves relative to the recording medium, the dust adhering to the surface of medium is removed by the contact member to assure a recording or reproduction operation free of errors.

2 Claims, 7 Drawing Sheets

OPTICAL HEAD SYSTEM WITH TRANSPARENT CONTACT MEMBER

FIELD OF THE INVENTION

The present invention relates to optical head devices operable on an optical principle for recording data on a recording medium or reproducing recorded data, and more particularly to an optical head device for recording data on a recording medium by projecting a beam on the medium while moving relative thereto or for reproducing data from the medium by detecting the light reflected therefrom.

BACKGROUND OF THE INVENTION

Optical discs are known as data recording media based on an optical principle. In addition to discs of the VLP (video long play) type already in wide use exclusively for reproduction, various optical discs have been developed which include those of the WORM (write once read mostly) type adapted for wrinting only once, and optomagnetic discs adapted for erasure and rewriting.

Figure 14:
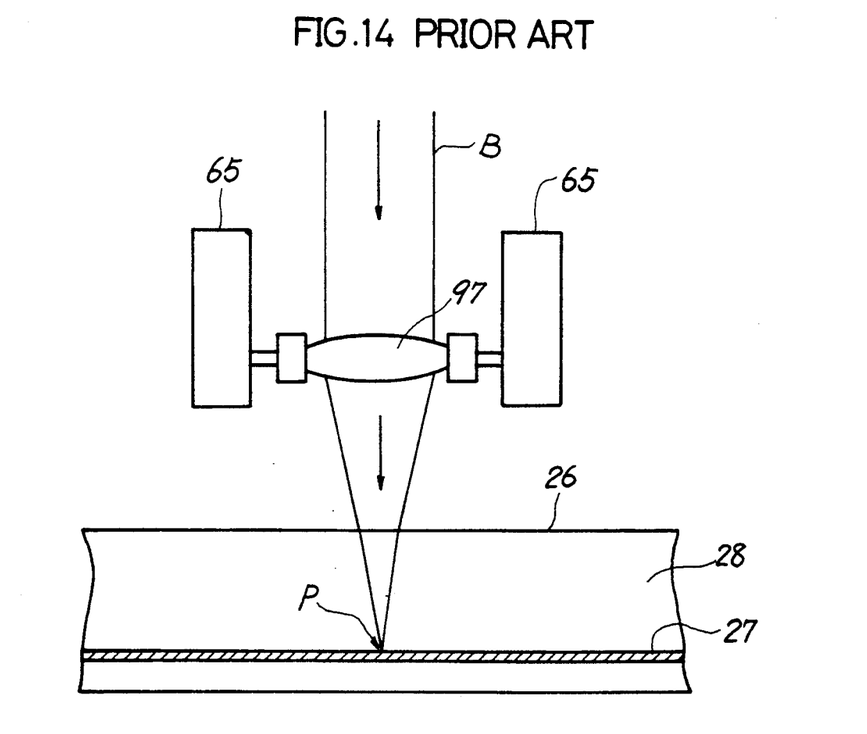
FIG. 14 is a fragmentary front view partly broken away and showing a conventional optical head device mounted on a disc player.

FIG. 14 shows an optical head device for projecting a light beam on an optical disc 26 to record data thereon or reproduce the recorded data. The laser beam B emitted by a laser light source is focused on the recording layer 27 of the disc 26 by an objective lens 97, which is disposed out of contact with the disc 26 and shiftable axially thereof by a focus actuator 65. The lens 97 is so controlled for focusing that a beam spot P having a specified diameter at all times will be formed on the recording layer 27.

Examined Japanese Patent Publications SHO 53-37722 and SHO 60-30017 disclose such focus control system and focus actuator.

On the other hand, optical tapes are under investigation as tapelike recording media having a greater capacity to optically record data than optical discs. Unexamined Japanese Patent Publications SHO 57-64333 and SHO 62-149036 disclose optical head devices for recording data on an optical tape or reproducing the recorded data.

Figure 13:
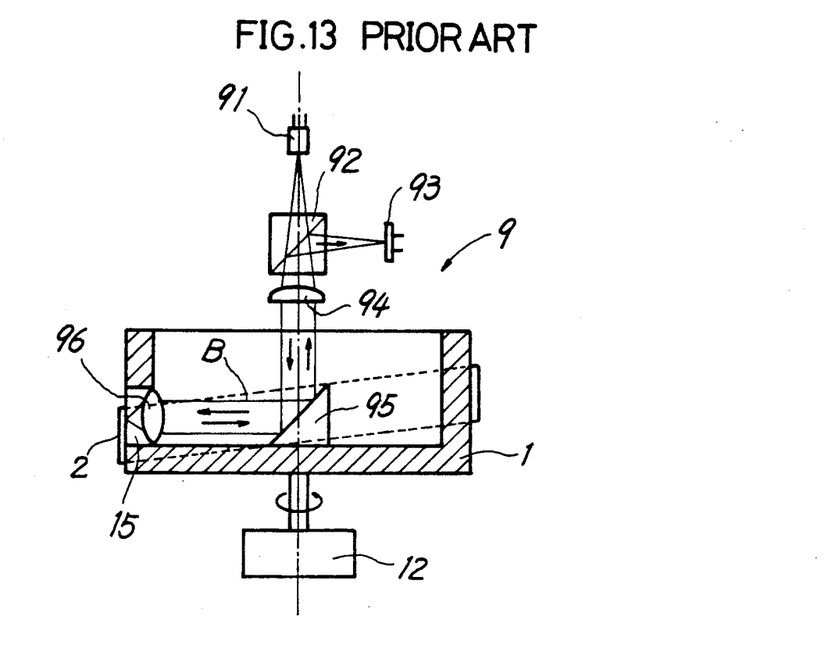
FIG. 13 is a side elevation partly broken away and schematically showing the construction of a conventional optical head device.

With reference to FIG. 13, the disclosed optical head devices comprise a rotary drum 1 for passing an optical tape 2 around its outer periphery over a predetermined angular range. The drum 1 is drivingly rotated by a drive motor 12. Disposed above the rotary drum 1 is an optical system 9 including a beam producing-detecting assembly, i.e., a laser diode 91, polarization beam splitter 92 and photosensor 93, and a collimator lens 94. Fixedly provided in the drum 1 centrally thereof is a reflecting prism 95 for reflecting the beam from the assembly toward a beam emanating aperture 15 formed in the peripheral wall of the drum 1. A convergent lens 96 for focusing the beam reflected from the prism 95 on the optical tape 2 is disposed in the aperture 15 a specified distance inwardly away from the outer peripheral surface of the drum 1.

With the rotation of the drum 1 driven by the motor 12, the tape 2 is caused to travel along the outer peripheral surface of the drum 1 by the operation of an unillustrated tape transport mechanism and is thereby helically scanned with the laser beam from the optical system 9, whereby data is recorded or reproduced.

However, the optical head device conventionally used for the optical tape 2 serving as a recording medium has the problem that minute dust particles adhering to the tape 2 cause recording or reproduction errors. This is due to the reason that since the beam spot on the tape has a very small diameter, for example, of about 1 micrometer, the dust particle blocks the beam if adhering to the tape.

With the optical head device of FIG. 14 for the optical disc serving as a recording medium, a transparent base layer 28 formed on the surface of the disc recording layer 27 has a relatively large thickness (e.g. 1 to 2 mm, so that the diameter of the beam spot formed on the surface of the base layer 28 is, for example, as large as 1 mm. Accordingly, dust particles of about 10 micrometers in size, even if adhering to the surface of the base layer 28, will cause no trouble to the recording or reproduction operation. On the other hand, with the optical tape which needs to be highly flexible, a transparent base layer (21, in FIG. 7), when covering the surface of the recording layer (22, in FIG. 7), must be as thin as about 10 micrometers, for example. Accordingly, the diameter of the beam spot on the surface of the base layer is also as small as tens of micrometers, so that the adhesion of minute dust particles poses a problem.

Further when the optical head device of FIG. 13 is to be equipped with the focus actuator disclosed in the foregoing publication SHO 60-30017, the focus actuator must invariably be provided inside the rotary drum 1 along with the convergent lens 96 and therefore requires a rotary drum of increased size, hence a problem. Moreover, since the focus acturator is adapted to position the objective lens in place by a magnetic force and a spring force in balance therewith, the provision of the means therefor gives rise to another problem in that the vibration due to rotation produces focus control errors.

SUMMARY OF THE INVENTION

An object of the present invention is to provide an optical head device which is free of the recording or reproduction errors that would result from the adhesion of dust to the surface of the recording medium.

Another object of the present invention is to provide an optical head device which is adapted to focus a light beam on optical tape with high accuracy without the necessity of using a focus actuator.

Still another object of the present invention is to provide an optical head device wherein the energy of a light beam emanating from an optical system can be given to the recording medium with a high efficiency.

The optical head device of the present invention comprises a transparent contact member disposed at a light beam emanating portion of an optical system for the recording medium to come into sliding contact therewith. Accordingly, when the recording medium and the transparent contact member move at a high speed relative to and in contact with each other during recording or reproduction of data, the dust adhering to the surface of the medium is removed by the transparent contact member, permitting a light beam from the optical system to pass through the contact member and then impinge on the surface of the recording medium without being blocked by the dust. Consequently, signals can be recorded on or reproduced from the recording medium free of errors.

In this case, the recording medium is in intimate contact with the transparent contact member and is maintained at a constant optical distance from the optical system, so that an accurate beam spot is formed on the surface of the recording medium at all times without necessitating the focus control conventionally effected by a focus actuator.

The beam incident face of the transparent contact member can be formed with a reflection preventing film having a suitable refractive index and a thickness to inhibit the reflection of light when the light beam from the optical system impinges on the contact member. Consequently, the energy of the light beam emerging from the optical system can be given to the recording medium without a loss to assure efficient recording.

When the material for the transparent contact member is selected suitably, the refractive index of the contact member can be made equal or approximate to that of a transparent base layer of the recording medium with which the contact member comes into direct contact, whereby the reflection at the interface between the contact member and the recording medium can be inhibited for the light beam to achieve a further improved recording efficiency.

DETAILED DESCRIPTION OF EMBODIMENTS

First Embodiment

Figure 1:
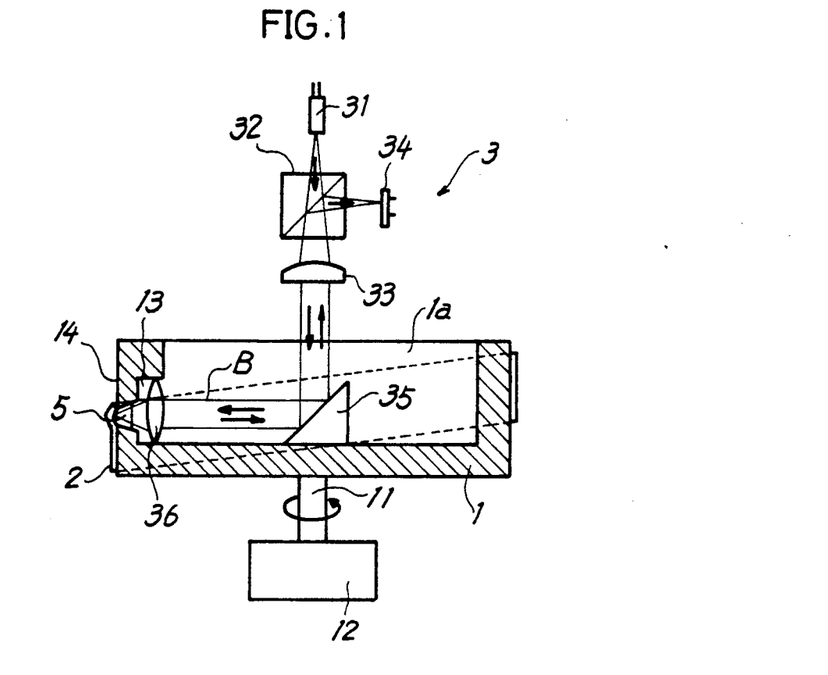
FIG. 1 is a side elevation partly broken away and schematically showing the construction of an optical head device wherein a laser beam producing-detecting assembly of an optical system is disposed above a rotary drum.

With reference to FIG. 1, a rotary drum 1 in the form of a hollow cylinder and having an open upper side is connected to the shaft 11 of a drive motor 12. An optical system 3 includes a laser beam producing-detecting assembly comprising a laser diode 31, polarization beam splitter 32, collimator lens 33 and photosensor which are disposed above the rotary drum 1 and each installed at a specified position on an optical axis. The rotary drum 1 has an outside diameter, for example, of 60 mm.

A reflecting prism 35 for reflecting a laser beam from the collimator lens 33 radially of the drum 1 is fixedly provided inside the drum 1 at the center of rotation thereof. A convergent lens 36 for focusing the laser beam B from the reflecting prism 35 on an optical tape 2 is disposed in a beam emanating aperture 13 formed in the peripheral wall of the drum.

Figure 2:
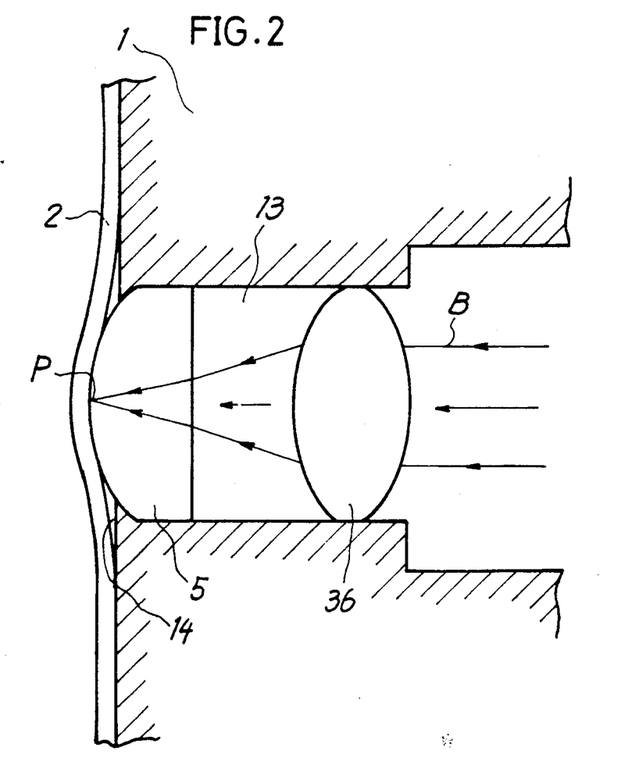
FIG. 2 is an enlarged plan view showing an optical path extending through the device of FIG. 1 from a convergent lens on the rotary drum to an optical tape via a transparent contact member.

A transparent contact member 5 made of glass, diamond or like transparent material is fixed in the outer side of the aperture 13, as slightly projected from the outer periphery 14 of the drum. The outer end of the contact member 5 projecting from the drum outer periphery 14 has a smooth curved face as seen in FIGS. 1 and 2. The contact member 5 projects from the drum outer periphery 14, for example, by 30 to 50 micrometers.

Accordingly, the optical tape 2 wound around the outer periphery 14 of the rotary drum 1 is slidable in contact with the outer end face of the transparent contact member 5 projecting from the beam emanating aperture 13 in the drum 1 and is slightly curved at the contact portion. Consequently, the optical tape 2 contacts the outer end face of the contact member 5 with a sufficient bearing pressure.

The distance between the convergent lens 36 and the transparent contact member 5 is determined in view of the focal length of the convergent lens 36, the refractive index of the contact member 5, etc. so that the beam spot to be formed on the surface of the tape 2 in contact with the member 5 has a predetermined diameter (e.g., 1 micrometer) as will be described later.

The optical tape 2 is wound around the outer periphery 14 of the rotary drum 1 at a specified lead angle by the operation of an unillustrated tape loading mechanism. The tape 2 in this state is caused to travel at a constant speed along the drum outer periphery 14 by the operation of an unillustrated tape transport mechanism.

The laser light from the laser diode 31 passes through the beam splitter 32 and the collimator lens 33, is made parallel laser rays and impinges on the reflecting prism 35. The laser beam B reflected from the prism 35 passes through the convergent lens 36 and impinges on the contact member 5, forming a beam spot P of a specified diameter (e.g., 1 micrometer) at the center of the surface of the tape 2 in contact with the contact member 5, i.e., at the top of the outer end face of the member 5.

When the drum 1 is rotated by driving the motor 12, the tape 2 is helically scanned with the beam spot P.

The laser beam reflected from the tape 2 impinges on the beam splitter 32 via the convergent lens 36, reflecting prism 35 and collimator lens 33. The laser light reflected at the beam splitter 32 is focused on the photosensor 34 and subjected to photoelectric conversion.

Figure 6:
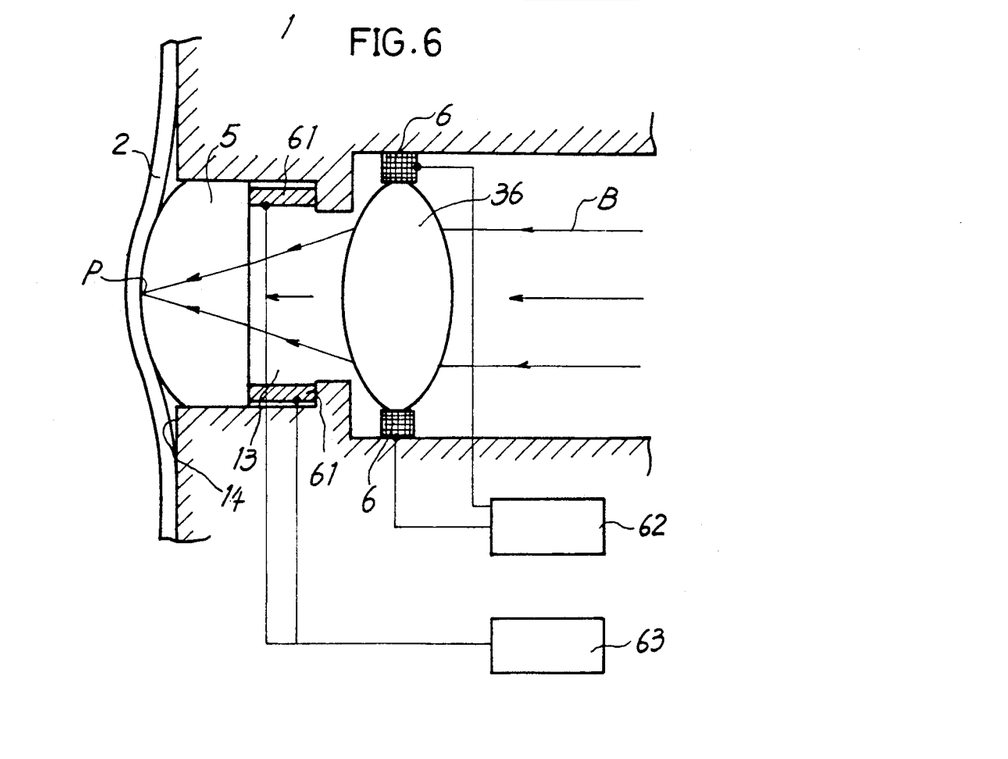
FIG. 6 is a plan view corresponding to FIG. 5 and showing another optical device adapted for tracking control and focus control.
Figure 7:
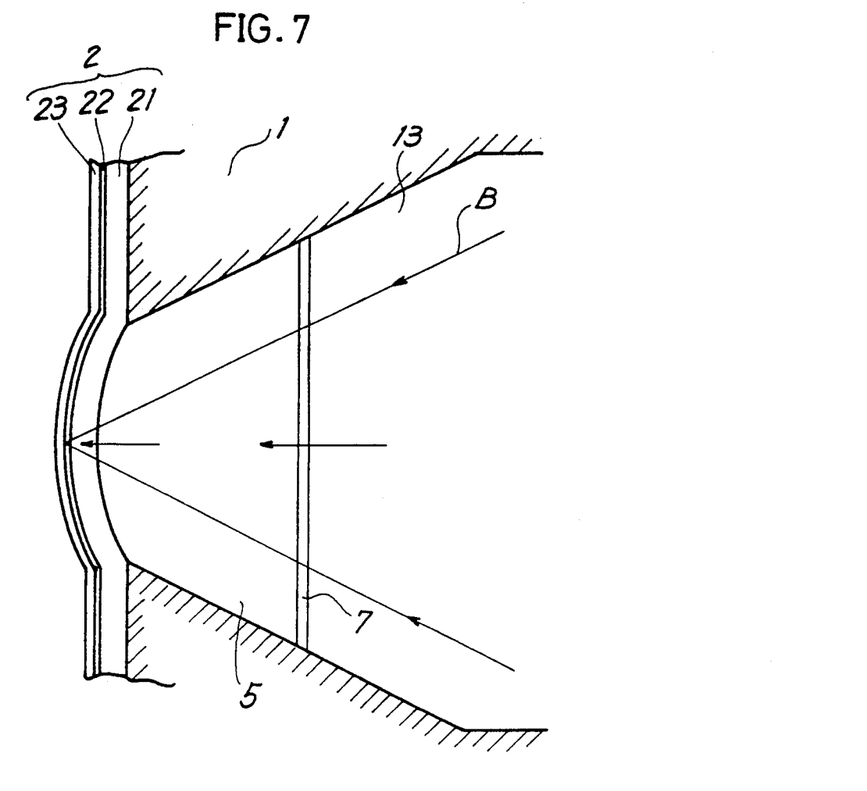
FIG. 7 is an enlarged plan view showing an embodiment which comprises a transparent contact member formed with a reflection preventing film on its beam incident face.

In the present embodiment (FIGS. 1 and 2) and the second and third embodiments (FIGS. 3 to 6), the optical tape 2 is described as having a recording layer on its surface side opposed to the transparent contact member 5, whereas in actuality, the tape can be of various constructions including the one shown in FIG. 7 and comprising a base layer 21 and a protective layer 23 formed on the respective surfaces of a recording layer 22.

For example, the optical tape 2 may be coated, on the surface of its recording layer to be opposed to the contact member 5, with a protective carbon film having a thickness of about 1000 angstroms. In this case, the influence of the protective film is negligible for the following reason. In the case where the laser light from the laser diode is 7800 to 8300 angstroms in wavelength $\lambda$, and the numerical aperture NA of the convergent lens 3 is 0.5, the depth of focus, Z, of the converged light is $$Z = \frac{\lambda}{2 \cdot (NA)^2} \simeq 1.6 \, \mu m$$

Thus, the depth of focus is much greater than the thickness of the protective film, so that no problem arises as to focus errors. Alternatively if the thickness of the protective layer exceeds the depth of focus, the distance between the transparent contact member 5 and the convergent lens 36 is to be adjusted in view of the thickness so that a laser beam spot of specified diameter will be formed on the tape recording layer.

The recording layer of the optical tape 2 is formed of a material of the phase-changeable type. When recording data, the tape 2 is irradiated with laser light of a high output, which renders the recording layer amorphous to record the data. To erase the data, laser light with a medium output is projected on the tape 2 to convert the amorphous portion to a crystalline portion, whereby the data is erased. Further when reproducing the data, laser light with a low output is projected on the tape 2, and the data is read out by detecting the intensity difference involved in the reflected laser light due to the difference in reflectance between the crystalline portion and the amorphous portion.

When the optical head device is used for recording or reproducing data, the optical tape 2 and the transparent contact member 5 move relative to and in contact with each other. During this movement, the dust adhering to the surface of the tape 2 is removed by the contact member 5, permitting the laser beam emanating from the optical system and passing through the contact member 5 to reach the surface of the tape 2 without being blocked by the dust. Consequently, signals can be recorded on or reproduced from the tape 2 free of errors.

Further since the transparent contact member 5 is disposed as slightly projected from the drum outer periphery 14, the tape 2 comes into intimate contact with the outer end face of the member 5 with a sufficient bearing pressure. This obviates variations in the distance from the convergent lens 36 to the optical tape 2 during recording or reproduction, for example, due to a flutter of the tape 2. Consequently, an accurate beam spot can be formed on the surface of the optical tape 2 at all times without the necessity of using the conventional focus actuator for focus control.

Second Embodiment

Figure 3:
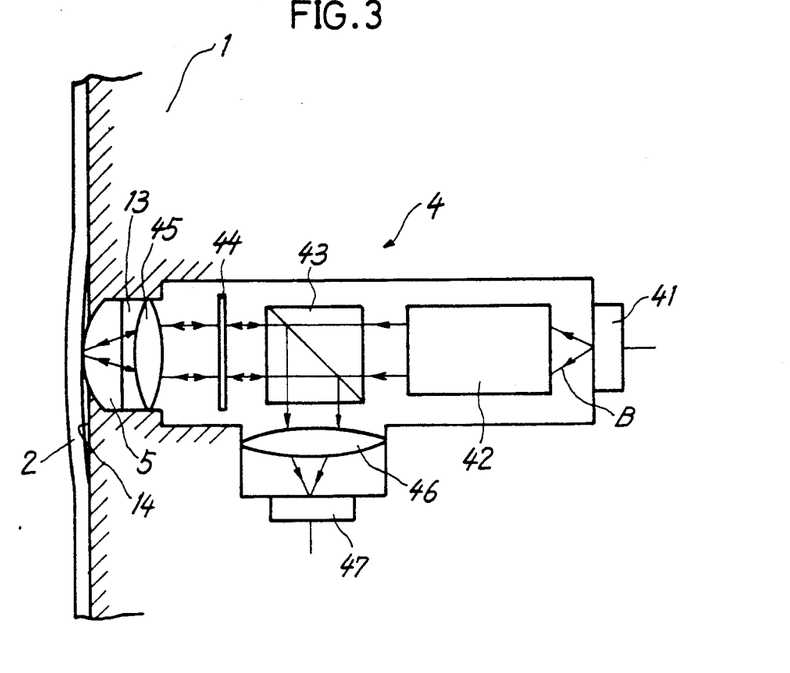
FIG. 3 is a plan view schematically showing the construction of an optical head device which comprises an optical system disposed entirely inside a rotary drum.

FIG. 3 shows an optical head device comprising an optical system 4 which is entirely disposed inside the rotary drum 1.

A laser diode 41 emits laser light, which is made into a beam of parallel rays by a collimator lens 42 and then impinges on a polarization beam splitter 43. The laser beam through the beam splitter 43 is passed through a quarter-wave plate 44 and thereby converted from a linearly polarized beam to a circularly polarized beam, which is then converged by a convergent lens 45 and passes through a transparent contact member 5 to form a spot on the surface of an optical tape 2.

The laser beam reflected at the tape 2 passes through the contact member 5, the convergent lens 45 and the quarter-wave plate 44. The laser beam linearly polarized by the plate 44 is incident on the beam splitter 43 and is reflected toward the convergent lens 46.

The laser beam reflected from the beam splitter 43 is focused by the convergent lens 46 on a photosensor 47, whereby the beam is subjected to photoelectric conversion.

The optical head device described above of course has the same advantage as the optical head device of FIG. 1.

Figure 4:
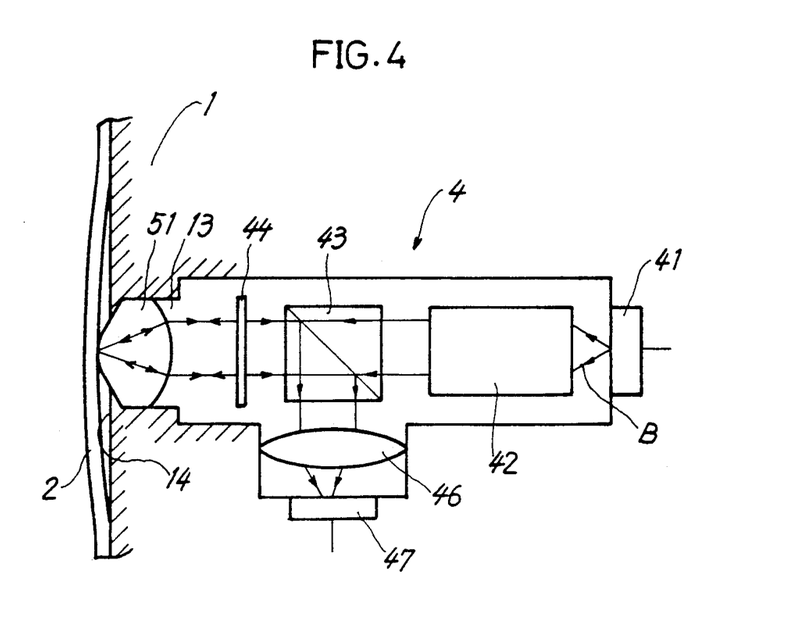
FIG. 4 is a plan view corresponding to FIG. 3 and showing an optical head device wherein a transparent contact member serves also the function of a convergent lens.

The convergent lens 45 can be dispensed with when a transparent contact member 51 is disposed as seen in FIG. 4. The member 51 is so shaped as to serve also the function of the lens 45. This arrangement reduces the number of assembling steps needed for the device of FIG. 3 and eliminates the need to adjust the distance between the transparent contact member 5 and the convergent lens 45.

Third Embodiment

With the optical head device of FIG. 1 or 3, the focus control for adjusting the distance between the convergent lens 36 or 45 and the optical tape 2 can be omitted as already stated, whereas the transparent contact member 5 will wear during a long period of use to gradually shorten the length of the optical path from the convergent lens to the optical tape and result in defocusing.

However, if it is attempted to remedy the defocusing by the conventional focus actuator, the vibration due to rotation gives rise to the problem of focus errors as already stated.

With the present invention, therefore, the defocusing due to the wear of the transparent contact member is corrected by using piezoelectric elements which are deformable by the application of voltage.

Figure 5:
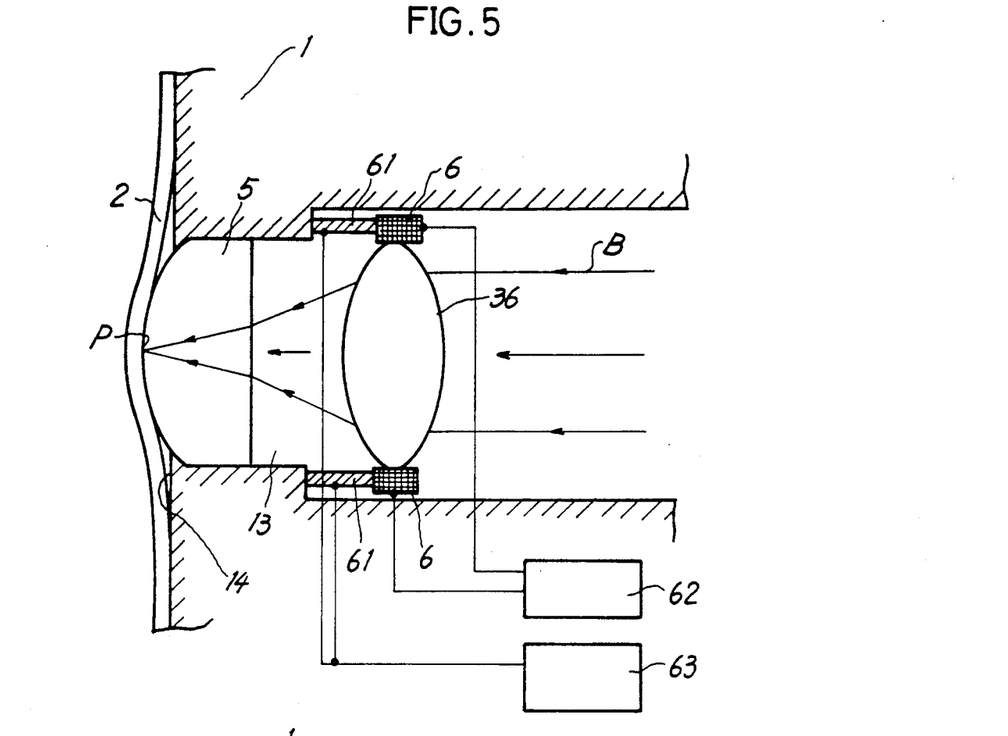
FIG. 5 is an enlarged fragmentary view of an optical device adapted for tracking control and focus control.

With reference to FIG. 5, a convergent lens 36 is supported on the wall of a rotary drum 1 by a first piezoelectric element 6 and a second piezoelectric element 61 connected to each other. A tracking control circuit 62 is connected to the first piezoelectric element 6, and a focus control circuit 63 to the second piezoelectric element 61.

The first piezoelectric element 6 is deformed by the application of a voltage signal to shift widthwise of the track on an optical tape 2 the converged spot of a laser beam formed by the convergent lens 36. The second piezoelectric element 61 is deformed by the application of a voltage signal to shift the convergent lens 36 along the optical axis thereof.

The tracking control circuit 62 can be composed, for example, of a tracking error detecting circuit already known in conventional disc players, and a driver circuit for preparing the voltage signal for driving the first piezoelectric element 6 in response to a tracking error signal obtained from the circuit.

Similarly, the focus control circuit 63 can be composed of a focus error detecting circuit already known in conventional disc players, and a driver circuit for preparing the voltage signal for driving the second piezoelectric element 61 in response to a focus error signal obtained from the circuit.

Accordingly, if the beam spot deviates from the specified signal track during reproduction of data, the tracking control circuit 62 applies to the first piezoelectric element 6 a voltage signal corresponding to the deviation, with the result that the tracking error is corrected. Further if the transparent contact member 5 wears owing to use for a long period, a voltage signal corresponding to the amount of wear is applied to the second piezoelectric element 61 by the focus control circuit 63, whereby the focus error is corrected.

With the optical head device described above, the convergent lens 36 is supported on the rotary drum 1 by the piezoelectric elements 6, 61, which will not be deformed by the force of vibration resulting from the rotation of the drum 1 even if the force is exerted on these elements. Consequently, the lens 36 is controllable for tracking and focusing free of errors.

Further the first and second piezoelectric elements 6, 61 can be arranged separately as seen in FIG. 6 for shifting the convergent lens 36 by the first piezoelectric element 6 to correct tracking errors and for shifting the transparent contact member 5 axially thereof by the second piezoelectric element 61 to correct focus errors.

Fourth Embodiment

When the converged light from the convergent lens 36 is incident on the transparent contact member 5, for example, in the optical head devices shown in FIGS. 1 and 2, the incident light is partly reflected owing to the difference in refractive index between the medium, i.e. air, filling the beam emanating aperture 13 and the transparent contact member 5. Since the reflected light impinges on the photosensor 34 along with the laser beam reflected from the optical tape 2, a noise is likely to be superposed on the output signal of the photosensor 34. Further there arises another problem in that during data recording, the intensity of light incident on the tape 2 decreases by an amount corresponding to the amount of energy of the reflected light.

Additionally, another problem as to reflection arises from the difference in refractive index at the interface between the contact member 5 and the tape 2.

With the present embodiment, therefore, a reflection preventing film 7 is formed on the incident face of the transparent contact member as seen in FIG. 7, and the refractive index of the contact member 5 is made approximately equal to that of the base layer 21 of the optical tape 2 by suitably selecting the material for the contact member, whereby the above problems are overcome.

Generally in the case where two media $P_1$ and $P_2$ which are different in refractive index are fitted together, and a beam advances from the medium $P_1$ with a refractive index of $n_1$ to the medium $P_2$ with a refractive index of $n_2$, the amplitude reflectance r at the interface is given by $$r = \frac{n_2 - n_1}{n_2 + n_1} \tag{1}$$

Figure 8:
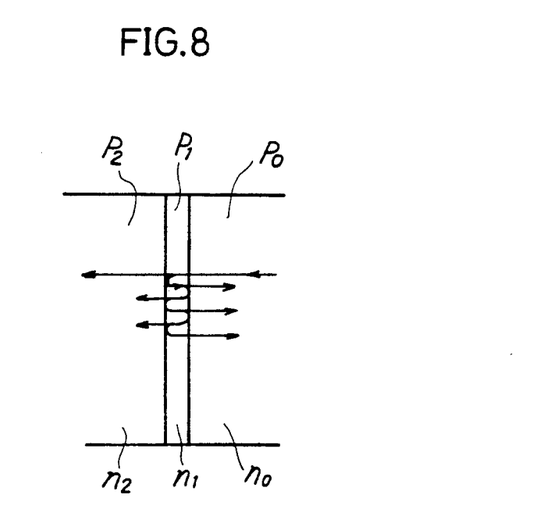
FIG. 8 is a diagram for illustrating the reflectance of light passing through three media which are different in refractive index.

As shown in FIG. 8, when a beam proceeds from the right leftward through three media $P_0$, $P_1$, $P_2$ which are different in refractive index, and the middle medium $P_1$ is a thin film, the beam advancing rightward from the interface between the media $P_0$ and $P_1$ is a first beam reflected at the interface plus a second beam reflected at the interface between the media $P_1$ and $P_2$ and passing through the interface between the media $P_0$ and $P_1$.

In this case, it is known that the overall amplitude reflectance (ratio in electric field amplitude between incident light and reflected light) $r_t$ of the medium $P_1$ which is present between the media $P_1$ and $P_2$ is expressed by the following equation in view of the difference in phase between the first beam and the second beam.

$$r_t = \frac{r_1 + r_2 \cdot e^{-i\delta}}{1 + r_1 \cdot r_2 \cdot e^{-i\delta}} \tag{2}$$

where $r_1$ is the amplitude reflectance at the interface between the media $P_0$ and $P_1$, and $r_2$ is the amplitude reflectance at the interface between the media $P_1$ and $P_2$, and are expressed by the following equations, respectively.

$$r_1 = \frac{n_1 - n_0}{n_1 + n_0}$$

$$r_2 = \frac{n_2 - n_1}{n_2 + n_1}$$

Suppose the thickness of the medium $P_1$ is d, and the wavelength of the beam is $\lambda$. $\delta$ is expressed by the following equation.

$$\delta = \frac{4\pi n_1 d}{\lambda} \tag{3}$$

Generally, what is termed reflectance means the reflecting power of energy and is expressed by the square of amplitude reflectance. When the thickness of the medium $P_1$ is so adjusted that $\delta = (2m+1) \times \pi$ where m is an integer, Equation (2) affords the reflecting power of energy, R, of the medium $P_1$ as expressed by the following equation $$R = \frac{(n_1^2 - n_0 n_2)^2}{(n_1^2 + n_0 n_2)^2} \tag{4}$$

Accordingly, when $$n_1 = \sqrt{n_0 n_2},$$

the reflectance of the medium $P_1$ can be made zero.

To sum up, the reflectance of the medium $P_1$ becomes zero when the refractive index $n_1$ and thickness d of the medium $P_1$ satisfy the following equations.

$$n_1 = \sqrt{n_0 n_2} \tag{5}$$

-continued
$$d = \frac{2m + 1}{4n_1} \cdot \lambda \qquad (6)$$

With the optical head device of FIG. 7, the reflection preventing film 7 is so formed as to satisfy Equations (5) and (6) given above to thereby inhibit the reflection of light incident on the transparent contact member 5.

Although the reflectance at the interface between the contact member 5 and the optical tape 2 can be inhibited effectively by providing a reflection preventing film at the interface, the refractive index of the contact member 5 is made approximately equal to that of the base layer 21 of the tape 2 to thereby inhibit the reflection at the interface. This effect is substantiated also by the fact that if $n_1 = n_2$, the reflectance r given by Equation (1) becomes zero.

For example, when a high polymer film of polyethylene (refractive index $n = 1.65$) is used as the base layer 21 of the tape 2, flint glass (refractive index $n_2 = 1.62$) is used for the contact member 5. The layer and the member are then approximately equal in refractive index, so that the reflectance at the interface therebetween becomes approximately zero.

Since the refractive index n0 of the air filling the beam emanating aperture 13 is 1, it is possible to use a material having a refractive index, given by Equation (5), of:

$$n_1 = \sqrt{1 \times 1.62} \simeq 1.27$$

as the reflection preventing film 7. For example, sodium fluoride NaF is 1.29 in refractive index and is therefore usable as the reflection preventing film 7.

Further when a laser beam with $\lambda = 0.8$ μm is used as the record reproducing beam, the NaF film is serviceable as the reflection preventing film 7 when the NaF film is made to have a thickness d of 1550 angstroms, as given by Equation (6) wherein m is 0.

Thus, when the refractive index n of the base layer 21 of the tape 2 is 1.65, the reflection at the interfaces at opposite sides of the transparent contact member 5 can be inhibited by forming the member 5 from flint glass and further forming the NaF film with a thickness d of 1550 angstroms over the beam incident face of the contact member 5.

With the optical head device described above, the reflection of light is inhibited at the interfaces on the opposite sides of the transparent contact member 5 to achieve an improved recording-reproduction efficiency.

The reflection preventing film 7, which is in the form of a single layer, can be composed of a multiplicity of layers, which then result in a further reduced reflectance. In the case where laser beams of different wavelengths are used, it is effective to prepare the reflection preventing layer from a multiplicity of layers in accordance with the respective beam wavelengths.

Fifth Embodiment

With optical head devices wherein a laser beam is used as the light source, it is practice to use laser beams of different wavelengths for the data recording mode and the data reproduction mode to obtain improved performance in each mode. In the case where laser beams of different wavelengths are used in this way, the chromatic aberration of the convergent lens results in variations in focal length for the different wavelengths, so that there arises a need for focus adjustment in accordance with the wavelength.

Although the provision of the focus control means shown in FIG. 5 or 6 is useful for this purpose, the need for focus adjustment is eliminated by forming the transparent contact member from a nonlinear optical material according to the present embodiment.

It is known that the refractive index n of substances varies with the intensity of light and is expressed by the following equation.

$$n = n_0 + n_2 \cdot | \quad |^2 \qquad (7)$$

where    is the electric field amplitude of light, and $n_2$ is a nonlinear refractive index. In the case of many substances, $n_2$ is very small, so that even if the intensity of light, | |, varies, n can be considered equal to $n_0$ (constant). Nevertheless, there are materials having a great $n_2$ value which is not negligible. With such materials, the refractive index increases as the intensity of light increases. The materials with such a property which is noticeable are termed nonlinear optical materials, and $LiNbO_3$, $KH_2PO_4$, 2-methyl-4-nitroaniline, etc. are known as such.

Figure 9:
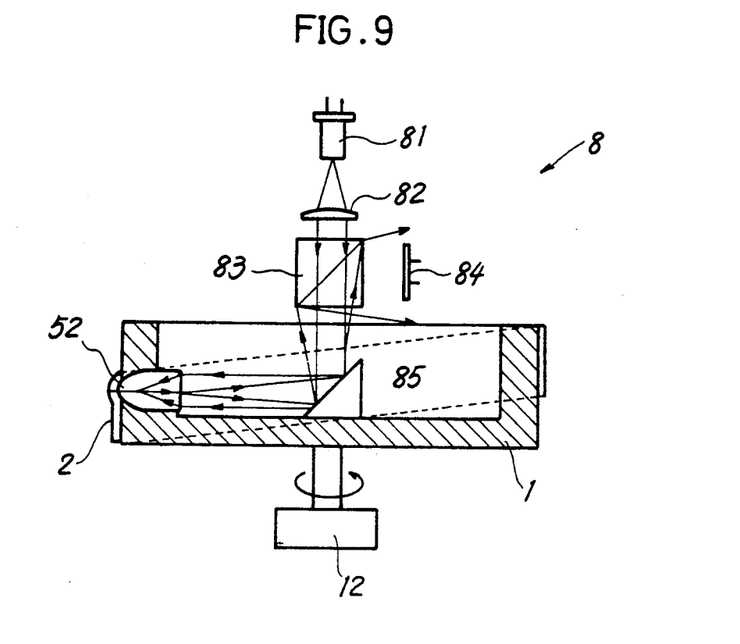
FIG. 9 is a side elevation partly broken away and schematically showing the construction of an embodiment which comprises a transparent contact member made of a nonlinear optical material.
Figures 11A, 11B:
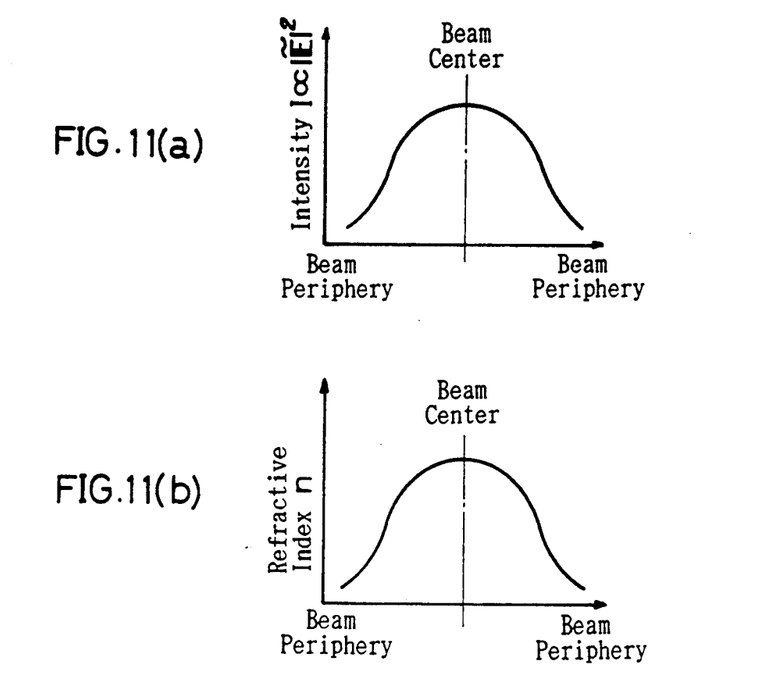
FIG. 11(a) is a graph showing the intensity distribution of a laser beam.
FIG. 11(b) is a graph showing the refractive index distribution of the transparent contact member.

With reference to FIG. 9, a transparent contact member 5 is made of a nonlinear optical material, and a laser diode 81 produces a laser beam having a Gaussian intensity distribution, i.e., a high intensity at the center of the beam and a low intesity at is peripheral portion, as seen in FIG. 11 (a).

The laser beam from the laser diode 81 passes through a collimator lens 82 and is thereby converted to a beam of parallel rays, which is then incident on the transparent contact member 52 via a beam splitter 83 and a reflecting prism 85. In this case, the contact member 52 exhibits at the beam incident portion thereof a distribution of refractive indexes n, with a high refractive index at the center of the beam as seen in FIG. 11(b).

Figure 10:
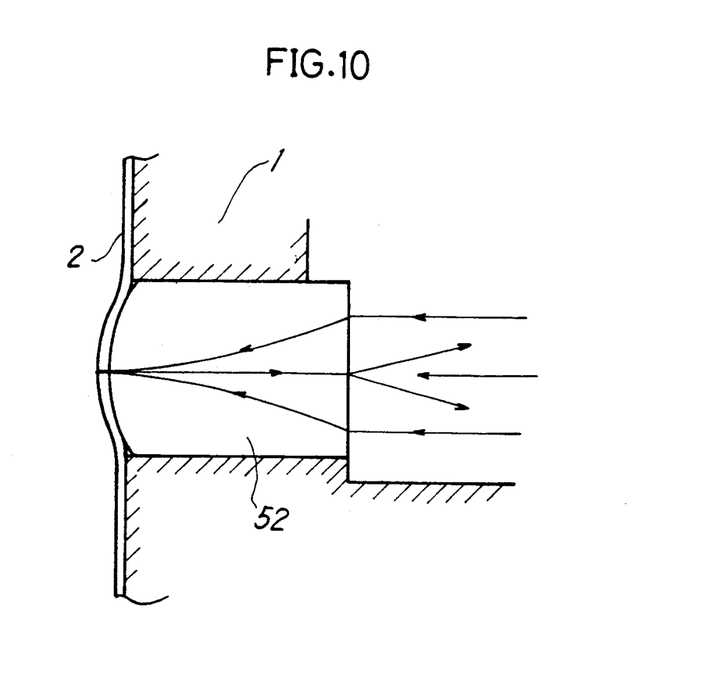
FIG. 10 is an enlarged plan view showing an optical path for a light beam through the transparent contact member of the device of FIG. 9.

Accordingly, the contact member 5 produces a lens effect, such that the beam propagated through the contact member 52 is converged as seen in FIG. 10. This phenomenon is called a self-focusing effect. The beam once converged travels, as held converged, through the contact member. This phenomenon is called a self-trapping effect.

The laser beam passing through the contact member 52 and converged by the self-focusing effect and the self-trapping effect forms a spot of redetermined diameter on the optical tape 2.

Upon reflection at the tape 2, the laser beam travels, as held converged by the self-trapping effect, through the contact member 52 and is dispersed by diffraction upon emanating from the contact member 52. The dispersed light impinges on the beam splitter 83 via the reflecting prism 85 and is reflected toward a photosensor 84, by which the light is subjected to photoelectric conversion.

With the optical head device described, the beam converged by the transparent contact member 52 is incident as held converged on the optical tape, so that even when a plurality of laser beams with different wavelengths are used, all the beams form a spot of specified diameter on the tape free of chromatic aberration. With the conventional convergent lens dispensed with, the arrrangement is useful, for example, for making the device compact.

Sixth Embodiment

The present embodiment is concerned with the structure of an optical tape 2 for the foregoing optical head devices to record data thereon or reproduce the data therefrom.

The transparent contact member 5 is slightly projected from the outer periphery 14 of the rotary drum 1, whereby the optical tape 2 is held in intimate contact with the member 5. The contact member 5 is formed of a hard material such as glass or diamond, whereas the base layer of the optical tape 2 is made of a soft material such as PET or polyimide. Accordingly, the high-speed movement of the tape and the contact member relative to each other is likely to cause damage to or wear the tape base layer. Such damage or wear will lead to recording or reproduction errors, a reduced C/N ratio, etc.

Figure 12:
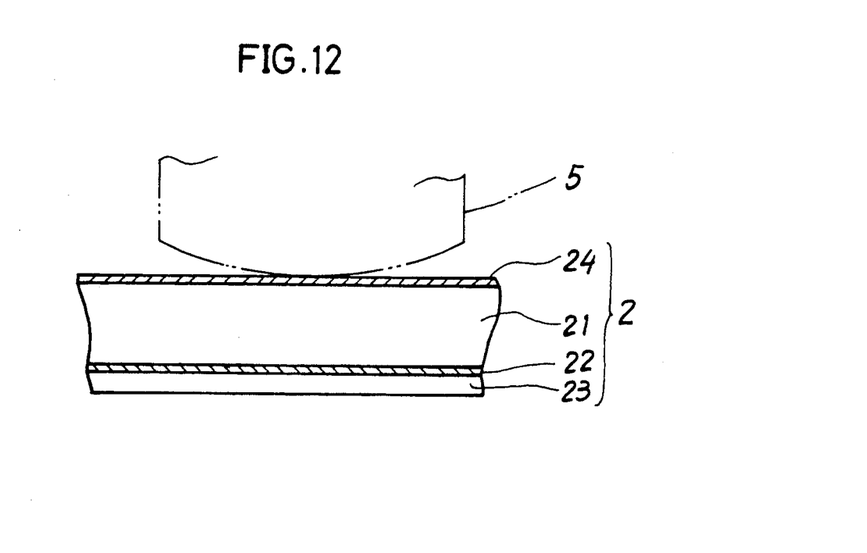
FIG. 12 is an enlarged sectional view of an optical tape having a light-transmitting hard film.

With the present embodiment, the base layer of the tape 2 is formed over its surface with a light-transmitting hard film 24 for protecting the tape from the damage or wear to be caused by the sliding contact with the transparent contact member 5.

The light-transmitting hard film 24 is prepared from diamondlike carbon to a thickness of 200 angstroms by the plasma CVD process. The base layer 21 is a PET film with a thickness of 10 micrometers. The recording layer 22 is made of SbTe recording material of the phase-changeable type and has a thickness of 600 angstroms. A protective layer 23 is a film of $SiO_2$ formed by vacuum evaporation to a thickness of 1000 angstroms.

Besides diamondlike carbon, materials usable for the hard film 24 are SiO, $SiO_2$, ZnS, $ZrO_2$, $A_2O_3$, $SnO_2$, SiC, MgO, $TiO_2$ and the like, and mixtures of such materials.

When used in the optical head devices, the light-transmitting hard film 24 of the optical tape 2 comes into sliding contact with the transparent contact member 5 to effectively prevent the damage to or wear of the tape 2.

The drawings and the foregoing description of the embodiments are given for illustrating the invention and are not to be interpreted as limiting the invention as defined in the appended claims or reducing the scope thereof. The construction of the present device or tape is not limited to those of the above embodiments but can be modified variously by one skilled in the art without departing from the scope of the invention as defined in the claims.

For example, although the embodiments described are concerned with optical head devices wherein an optical tape is used as the recording medium, the arrangement of the invention wherein the transparent contact member is provided at the beam emanating portion of the optical system is of course applicable to disc players.

What is claimed is:

1. An optical head device for projecting a light beam on a recording medium to record data thereon or reproduce the recorded data, the device being characterized in that the device comprises an optical system for forming at least one beam spot of a specified diameter on the surface of the recording medium, a transparent contact member disposed at a light emanating portion of the optical system for the recording medium to come into direct sliding contact therewith, said transparent contact member being disposed on a guide surface for guiding movement of the recording medium relative to the optical system, said transparent contact member projecting slightly from the guide surface, the transparent contact member having a beam incident face, and a reflection preventing film for inhibiting reflection of the light beam being formed on the beam incident face of the transparent contact member.

2. An optical head device for projecting a light beam on a recording medium to record data thereon of produce the recorded data, the device characterized in that the device comprises an optical system for forming at least one beam spot of a specified diameter on the surface of the recording medium, a transparent contact member being disposed at a light emanating portion of the optical system for the recording medium to come into direct sliding contact therewith, said transparent contact member being disposed on a guide surface for guiding movement of the recording medium relative to the optical system, said transparent contact member projecting slightly from the guide surface, the transparent contact member being formed of a non-linear optical material.

* * * * *